US006752082B2

(12) United States Patent
Derhak et al.

(10) Patent No.: US 6,752,082 B2
(45) Date of Patent: Jun. 22, 2004

(54) SYSTEMS AND METHOD FOR SELECTING A MEDIA FOR A PRINT JOB

(75) Inventors: Maxim Wasyl Derhak, West Jordan, UT (US); Dean Andrew Derhak, West Jordan, UT (US); Lloyd James Cundiff, Midvale, UT (US)

(73) Assignee: Océ Display Graphics Systems, Midvale, UT (US)

( * ) Notice: Subject to any disclaimer, the term of this patent is extended or adjusted under 35 U.S.C. 154(b) by 0 days.

(21) Appl. No.: 10/370,898

(22) Filed: Feb. 20, 2003

(65) Prior Publication Data

US 2003/0177930 A1 Sep. 25, 2003

Related U.S. Application Data

(60) Provisional application No. 60/358,564, filed on Feb. 21, 2002.

(51) Int. Cl.[7] ............................. B41F 1/54; G06F 15/00; G06K 15/00; B41J 11/44
(52) U.S. Cl. ........................ 101/484; 358/19; 358/1.13; 358/1.15; 358/1.16; 400/76
(58) Field of Search ........................ 101/484; 358/1.13, 358/1.15, 3.06, 1.18, 1.16, 1.9; 400/578, 582, 76, 61; 347/177

(56) References Cited

U.S. PATENT DOCUMENTS

| | | | | |
|---|---|---|---|---|
| 5,168,374 A | * | 12/1992 | Morimoto | 358/426.05 |
| 5,305,020 A | | 4/1994 | Gibbons et al. | 347/177 |
| 5,450,571 A | | 9/1995 | Rosekrans et al. | 703/24 |
| 5,467,434 A | | 11/1995 | Hower, Jr. et al. | 358/1.15 |
| 5,696,894 A | * | 12/1997 | Ono | 358/1.15 |
| 5,923,942 A | * | 7/1999 | Nuggehalli et al. | 399/389 |
| 6,206,360 B1 | * | 3/2001 | Urata et al. | 271/9.06 |
| 6,256,107 B1 | * | 7/2001 | Toda | 358/1.15 |
| 6,259,468 B1 | * | 7/2001 | Higuchi | 347/262 |
| 6,299,364 B1 | * | 10/2001 | Maruta et al. | 400/76 |
| 6,339,477 B2 | * | 1/2002 | Mori | 358/1.14 |
| 6,401,141 B1 | * | 6/2002 | Kumler | 710/10 |
| 6,437,875 B1 | * | 8/2002 | Unno | 358/1.16 |
| 6,447,184 B2 | * | 9/2002 | Kimura et al. | 400/578 |
| 6,469,796 B1 | | 10/2002 | Leiman et al. | 358/1.15 |
| 6,501,485 B1 | | 12/2002 | Dash et al. | 345/700 |
| 6,552,813 B2 | * | 4/2003 | Yacoub | 358/1.1 |
| 6,574,002 B1 | * | 6/2003 | Paczewitz | 358/1.13 |
| 6,581,097 B1 | | 6/2003 | Lynch et al. | 709/226 |
| 2001/0048533 A1 | * | 12/2001 | Koana | 358/1.15 |
| 2002/0101607 A1 | * | 8/2002 | Hull | 358/1.15 |
| 2002/0118380 A1 | * | 8/2002 | Krueger et al. | 358/1.9 |
| 2002/0124027 A1 | * | 9/2002 | Krueger et al. | 707/528 |
| 2002/0186415 A1 | * | 12/2002 | Condon et al. | 358/3.06 |
| 2002/0186416 A1 | * | 12/2002 | Trelewicz et al. | 358/3.06 |
| 2003/0011812 A1 | * | 1/2003 | Sesek et al. | 358/1.15 |
| 2003/0046131 A1 | | 3/2003 | Hotzwarth | 358/1.15 |
| 2003/0067618 A1 | * | 4/2003 | Farrell et al. | 358/1.12 |
| 2003/0072030 A1 | | 4/2003 | Haines et al. | 705/7 |
| 2003/0086114 A1 | * | 5/2003 | Cherry et al. | 358/1.15 |

\* cited by examiner

*Primary Examiner*—Edward Lefkowitz
*Assistant Examiner*—Wasseem H. Hamdan
(74) *Attorney, Agent, or Firm*—Workman Nydegger

(57) ABSTRACT

Systems and methods for selecting a media and a page size. A combination is provided for each media/page size pair in a printing system. A user can select a combination from a list of combinations and the media and page size that correspond to the selected combination are identified and used for a print job of the user. A color profile is selected automatically. The selected media is loaded in an appropriate printer and printed. The combination is an encrypted value that includes a media and a page size. The combination optionally includes an entity identifier. The combinations or identifiers are usually specific to a particular entity and cannot be used by other competing entities.

26 Claims, 3 Drawing Sheets

SYSTEMS AND METHOD FOR SELECTING A MEDIA FOR A PRINT JOB

CROSS-REFERENCE TO RELATED APPLICATIONS

This application claims the benefit of U.S. Provisional Application No. 60/358,564, filed Feb. 21, 2002 and entitled "Systems and Methods for Media Selection," which is hereby incorporated by reference.

BACKGROUND OF THE INVENTION

1. The Field of the Invention

The present invention relates to selecting both a media and a page size for a print job in a printing system. More particularly, the present invention relates to systems and methods for selecting a media, a page size, and/or a color profile using unique combinations or identifiers that are associated with the media, page size, and/or color profile.

2. Background and Relevant Art

Printing is becoming an increasingly difficult and complex experience for many users who are unfamiliar with the printing process. The printing process is much more than simply sending a print job to a printer. Properly printing a print job requires an understanding of media, page sizes, color profiles, etc. Media, for instance, comes in a number of types and page sizes. Inks and color profiles are often selected according to the media and the quality of a particular print job often depends on whether the user selects the appropriate ink and/or color profile for a particular media. The printing process becomes even more complex when a user must also select a printer.

Because users are often unfamiliar with the printing process, it is difficult for users to select the proper combination of media and page size for their print jobs. Users are typically even more unfamiliar with selecting color profile and ink combinations. As a direct consequence of the selection (media, page size, color profile, and/or printer) made by a user, the print job may print incorrectly by being, for instance, off of the selected page, off centered, and the like. In addition, much of the media may be wasted or rendered unusable when an incorrect media/page size selection is made by a user. Thus, typical users have difficulty in selecting the appropriate media/page size and in optimizing a printer for the selected media and page size.

There are many situations where there is a need to print on a particular media using a particular page size. Vendors, for example, often place posters in businesses where their products are sold. These posters are usually designed for a particular type of media and for a particular page size. The vendors, however, are often asked to print the posters that are displayed in the businesses where their products are sold. The posters are printed incorrectly or with sub par coloring when vendors do not select the appropriate media/page size or properly configure the printer for the posters.

Another problem relates to media that comes pre-mounted. If an incorrect page size is selected for the pre-mounted media, then much of the pre-mounted media is wasted. Photo studios, for example, often receive requests by users to enlarge an image. If the equipment operator does not understand the impact of selecting the proper media and page size, it is likely that the printed image will be of poor quality and on the wrong media and/or page size.

Some types of media require that a certain color profile be used, a certain amount of ink be placed on the media, or that the printer be configured a particular way. If too much ink is placed in the media, the colors, and consequently the image, may not be clear. Even worse, the ink may actually run and ruin the image. Conversely, an insufficient amount of ink results in an unsatisfactory image as well. In essence, users often fail to understand the relationships that exist between media, page sizes, color profiles, and printers. Users also fail to understand how a color profile may change from one media to the next. Thus, users are often unsure about the media and/or page size that they have selected for their print jobs.

Another problem with media selection is seen from the perspective of an entity that provides media and printing services to users including other businesses. These entities would like to ensure that users continue using their services and purchasing their products. Entities currently do not have the ability to lock their printing systems in a sense that the entity controls the media and page size that is available to the user along with the ability to prevent other entities from using their printing systems. In other words, entities are unable to prevent their printing services and systems from being used with media supplied by a different entity.

BRIEF SUMMARY OF THE INVENTION

These and other limitations are overcome by the present invention which relates to selecting a media and a page size of the media in a printing system. The present invention further relates to systems and methods for selecting a media/page size/color profile using combinations or identifiers that are related to particular media/page size pairs or groups.

In a printing system, several different media/page size pairs are available. The media/page size pairs are identified and provided to a coding entity. The coding entity generates a combination or identifier for each media/page size pair and provides the resulting combinations to the submitting entity. Typically, the submitting entity is unable to create new combinations for new media/page size pairs because the combination is encrypted, hashed or otherwise coded by the coding entity. New media/page size pairs are submitted to the coding entity which generates a combination or identifier for the new media/page size pair. Each media/page size pair is labeled or associated with the corresponding combination provided by the coding entity.

As previously stated, a user that desires to print a print job in a printing system is required to identify a particular media and the appropriate page size. In accordance with the present invention, each media type/page size pair has an associated combination or identifier. By selecting or identifying a particular combination, a user is able to select the appropriate media and page size without being aware of the specific media type or the specific page size that was actually selected. In one example, this is possible because the media type/page size pair and the combination are visually associated. An example of each media type/page size may be displayed to the user along with the combination to facilitate their selection. Thus, the user can simply view the desired media/page size and select the associated combination or identifier.

After the user selects a combination, the printing system automatically identifies the media and page size associated with the selected combination. The printing system also automatically selects and configures the appropriate printer, thus simplifying the process for the user. In other words, the user is no longer required to configure the system or a printer for a particular media/page size. The appropriate color profile for that combination is usually applied automatically according to the selected media/page size and the user is permitted to print the print job on the printer that has the appropriate media/page size loaded.

The combination or identifier is generated from the various media/page size pairs. In some instances, the combination or identifier incorporates an entity identifier, which has the effect of making those combinations specific to a particular entity or group of entities. This provides an advantage to the entity that supplies media to users, for example, because other entities cannot copy or use the combination that is entity specific. Each printing system may store a list of approved entities. A combination that does not include an approved entity cannot print on the printing system. Also, the combinations cannot be copied because each combination is a hash of a particular media and page size. As a result, the combinations are often dependent on the entity producing or selling the media in addition to the media type and/or page size. When a combination is selected, the media/page size pairs available to the printing system are hashed and compared against the selected combination to identify the appropriate media/page size.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
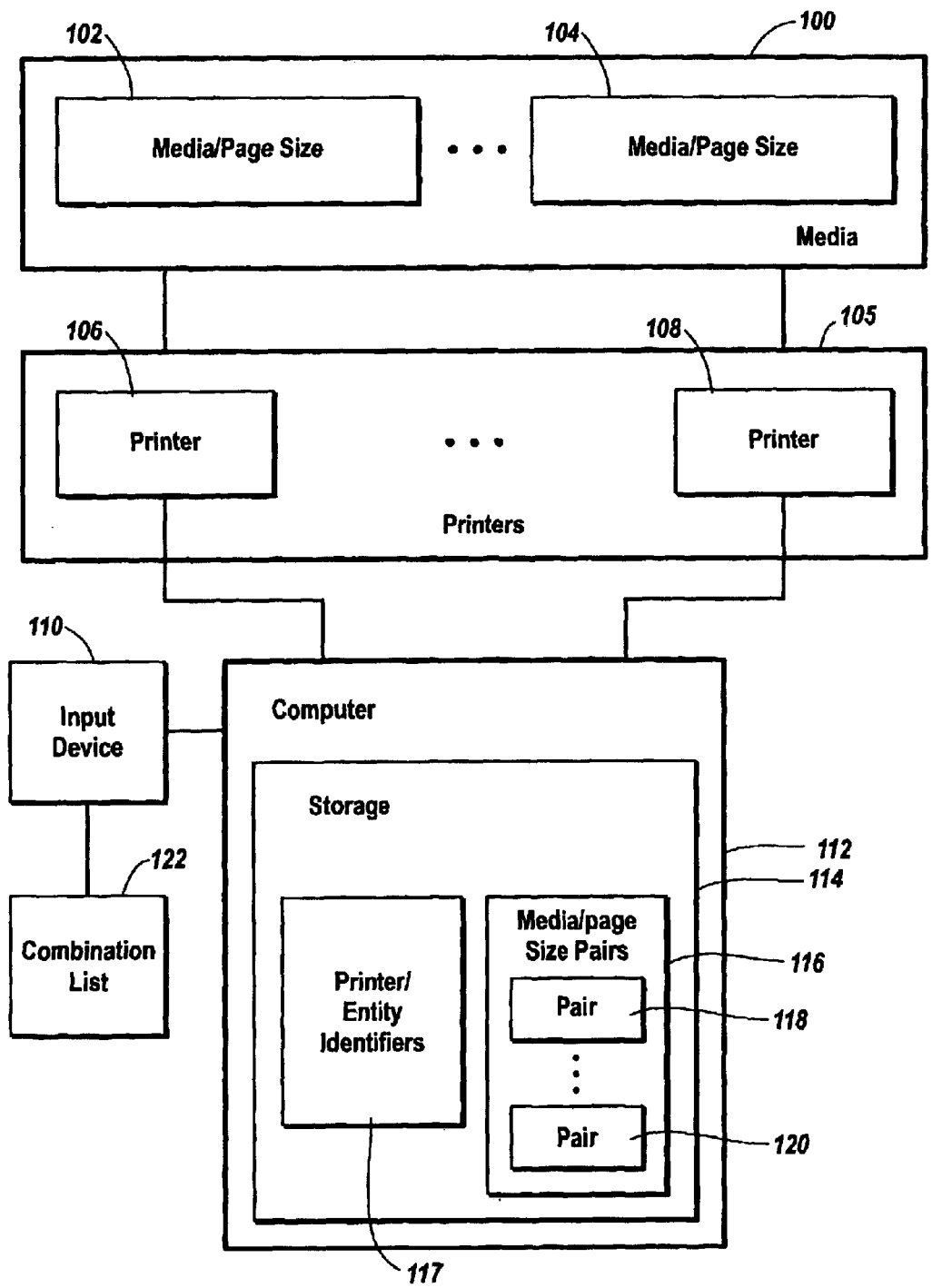
FIG. 1 illustrates an exemplary printing system wherein the present invention may be implemented.

The present invention relates to systems and methods for selecting a media and a page size for a printing job using combinations or identifiers that are associated with media/page size pairs. Each media/page size pair corresponds to a particular page size of a particular media. Using an input device such as a bar code reader, a user is able to select a media, a page size, and/or a color profile in a single step by choosing the combination associated with a media and a page size. After the user selects or identifies a particular combination, the printing system identifies the media and the page size for the user using the selected combination. The printing system automatically provides the appropriate color profile for the selected media and page size.

One advantage of the present invention is that users, including both individuals and businesses, are able to easily select and use a particular media/page size pair. Users are also assured of proper color management because the entity providing the printing system ensures that the media calibration and color profiles are automatically selected when the user selects a media and a page size. In addition, entities are able to deploy an inexpensive printing system that is dedicated to the media products supplied by that entity. In other words, the printing system is tied to the media products supplied by that entity and it is difficult to use the printing system with media from other entities. In one embodiment, the present invention limits the media and page sizes to those that are approved by an entity and the entity is able to label their media appropriately for quick and easy user selection.

Another advantage of the present invention is that users are not required to have an understanding of different medias, page sizes, and color profiles. Currently, a user is typically required to select a media from a list of media. This list can be long and may have names that are essentially meaningless to some users. A user is also required to select a page size in these situations. As with the list of media, the list of page sizes may include a large number of different page sizes and a user is often unaware of the distinctions between some of the page sizes.

The present invention removes this difficulty from the user such that the media/page size can be easily and quickly selected. In one example of the present invention, each combination or identifier that is associated with a particular media/page size pair is visually associated with that media/page size pair. Examples of the media may be displayed to the user and each example is labeled with the corresponding combination or identifier. A user is able to visually determine which media/page size pair they want and select the appropriate combination. Thus, the user selects a media/page size pair without having to sort through lists of media names and page size names that are difficult to understand. The user can select the appropriate media and page size without actually knowing which media and page size was selected.

As used herein, "media" or "media type" refers to material or paper that is used for printing or publishing. Media or media type refer, for example, to paper, white paper, photogloss paper, vinyl, canvas, backlit, and the like or any combination thereof. "Page size" refers to a particular size of the media. Exemplary page sizes include, but are not limited to, 36 inch roll, 42 inch roll, A4, A3, and the like or any combination thereof. It is understood by one of skill in the art that there are many different medias and many different page sizes and that the pages sizes available for a particular media may or may not be available for another media.

A color profile or color calibration refers to color processing, ink limits, linearization, printing parameters (such as print speed, print passes, drying time, etc.), and the like or any combination thereof. A color profile also refers to how the ink/colorant is placed on the media as well as how much ink/colorant is placed on the media for any given image. A color profile can thus have an impact on how an image is printed on a particular media and in many instances, the choice of media influences the color profile. Usually, because the media and page size are known after the user selects a combination, an optimized color profile is automatically selected for the user.

FIG. 1 illustrates an exemplary printing system or environment in which the present invention may be implemented. In this example, the media 100 represents the media that are available to a particular printing system. Each media has a page size and FIG. 1 illustrates the particular media/page size pairs that are available for use in the printing system. These media/page size pairs are represented by a media/page size 102 and a media/page size 104.

In the printing system illustrated by FIG. 1, there are various printers 105 that are available for printing. FIG. 1 illustrates the available printers as a printer 106 and a printer 108. The printers 106 and 108 are not necessarily the same printer and may have different capabilities. The printer 106, for example, may be used to print on media such as A4 while the printer 108 may be used to print on media such as 42 inch rolls. A printing system can have a printer for each media or can have printers that can each accommodate more than one media type.

The computer 112 can send a print job to any of the printers 105. The computer 112 also has access to a storage 114 that stores the media/page size pairs 116 that are available in a given system. These pairs are represented in the storage 114 as media/page size pair 118 and media/page size pair 120. This example illustrates that the storage 114 is local to the computer 112, but the storage 114 can be remotely located and accessible over a network, for example. In this example, a pair 118 corresponds to the media/page size 102 and the pair 120 corresponds to the media/page size 104.

When the computer 112 (or user) selects a combination from the combination list 122, the computer 112 is able to determine or identify the media/page size pair that corresponds to the selected combination or identifier as described below. In one example, the combination list 122 includes a label mounted on or near the media/page size 102 and a label mounted on or near the media/page size 104. This visually associates each combination with a media/page size pair. Usually, the combinations in the combination list 122 are not stored in the storage 114. In another embodiment, however, the combination list 122 may be stored in the storage 114. The combination selected by the user is received by the computer 112 and is used to identify the appropriate pair such that the computer 112 knows which media/page size to use for the print job.

After the media/page size (pair 118, for example) is identified using the selected combination received from the user, the media/page size 102, which corresponds to the pair 118, is loaded on the appropriate printer or the printer that has the media/page size 102 already loaded is selected for use. In one example, the specific combination selected by the user from the combination list 122 may be represented by a bar code and may be selected by an input device 110 such as a bar code scanner, although the present invention is not limited to bar codes and bar code scanners. The specific combination can also be identified or selected through the keyboard of the computer 112.

The printing system illustrated in FIG. 1 can be a locked system, an unlocked system, or a mixed system. Within the printing system, a particular printer can also be locked, unlocked, or mixed. A locked printer or system is limited to the combinations that are available for selection by the user or to the available media 100. An open system, on the other hand permits a user to select media/page size pairs that do not have an associated identifier stored in the computer 112. A mixed system is a combination of a locked system and an unlocked system and is often applied on a per printer basis. A mixed system, for example, may include a locked printer and an unlocked or open printer.

The status (locked, unlocked, mixed) of a particular system or printer is often established by in a file in the storage of the computer 112 that establishes status for each printer individually and/or for the system as a whole. For example, the computer 112 in FIG. 1 also includes printer/entity identifiers 117 in the storage 114. Because a combination may be specific to a particular entity, the printer/entity identifiers 117 are used to ensure that the selected combination is intended for use with the printing system. In other words, if the entity identifier that is an inherent part of the combination does not match the entity identifier 117 that is providing the printing system, then the selected combination will not function in the printing system. This ensures that a particular entity can control how media/page sizes are selected in their printing system and enables the particular entity to lock out other entities. The combinations of one entity for media/page size pairs are not the same as the combinations of another entity for the same media/page size pairs because each combination typically includes an entity identifier. This permits the printing system to preclude media from another entity from being used in the printing system of another entity.

Figure 2:
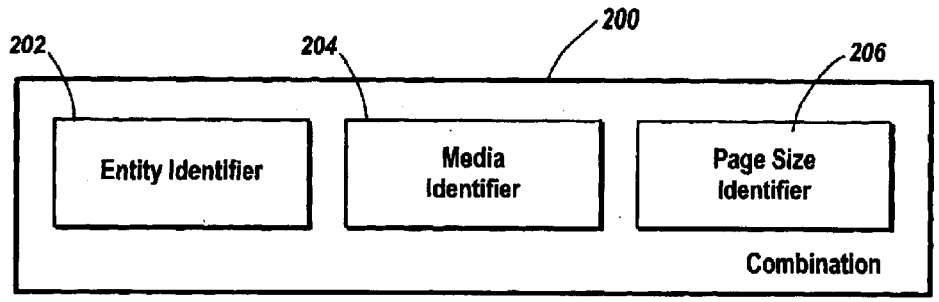
FIG. 2 illustrates an exemplary combination that includes an entity identifier, a media type, and a page size.

FIG. 2 illustrates an exemplary identifier or combination 200 that is associated with a particular media identifier 204 and a particular page size identifier 206. The combination 200 optionally includes an entity identifier 202. The entity identifier 202 enables the combination 200 to be specific, for instance, to a particular entity, user, owner, or group of entities or users. The color profiles and other calibrations that may be necessary for a particular media/page size pair are often performed automatically when a combination is selected by a user.

Figure 3:
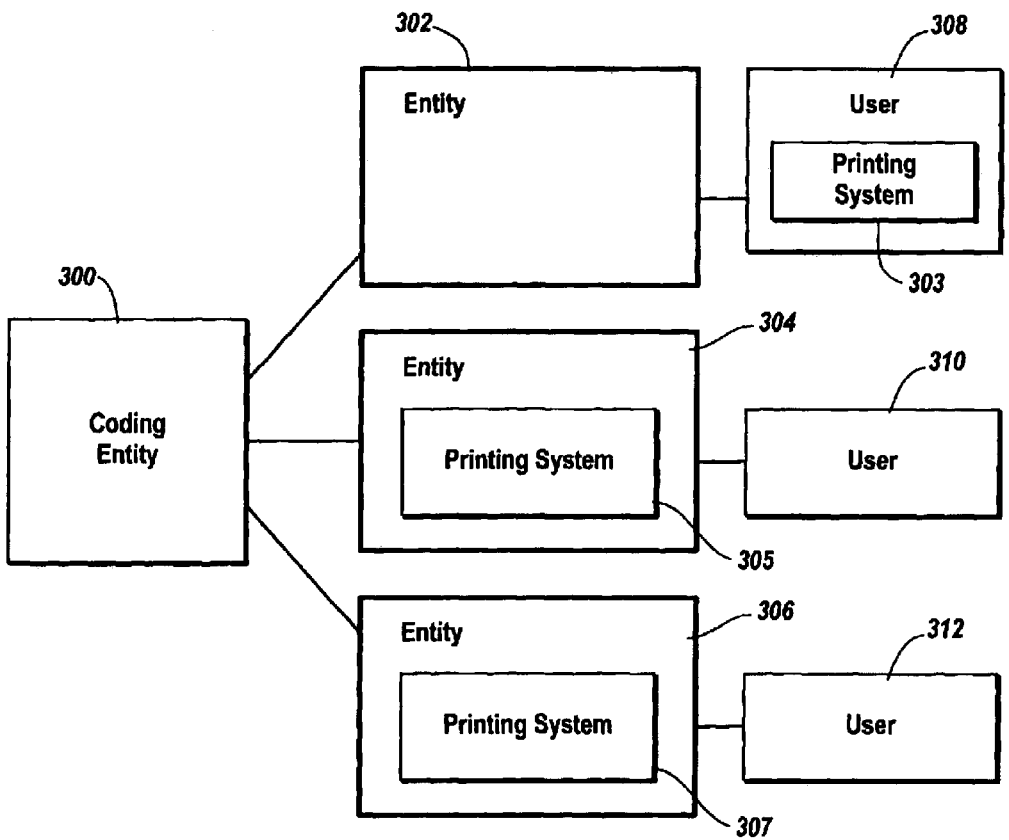
FIG. 3 is a block diagram that illustrates a coding entity that provide combinations or identifiers to entities whose printing systems are utilized by users.

FIG. 3 is a block diagram used to illustrate the present invention from the perspective of various entities or users. FIG. 3 illustrates an entity 304 with a printing system 305 and an entity 306 with a printing system 307. An exemplary printing system is described in FIG. 1. In one embodiment, the users illustrated in FIG. 3 can be individuals, businesses or other entities. For example, the entity 302 may produce and sell the printing system 303 and media to the user 308. The present invention enables the entity 302 to lock the printing system 303 of the user 308 such that only media produced by the entity 302 can be used on the printing system 303. In other words, the printing system 303 may be locked such that the user 308 preferably continues to purchase media from the entity 302 instead of from a competitor because the media used by the printing system 303 are associated with combinations that are specific to the entity 302. The printing system 303, however, can be partially locked or unlocked.

To implement the printing system 303 (or printing system 305 and 307), the entity 302 begins by identifying each media/page size pair that the entity 302 will provide to the user 308 or for their own purposes. These media/page size pairs are supplied to the coding entity 300. After receiving the media/page size pairs or groupings from an entity, the coding entity generates identifiers or combinations for each media/page size pair or group. The combinations are often represented as a bar code and an image of the bar code is provided to the entity 302. The entity 302 can use the image to label the appropriate media. Thus, each media/page size pair is labeled with a different combination. The entity 302 also places the bar code or other representation such that the user 308 can quickly select a particular combination using an input device such as a bar code reader. It is understood by one of skill in the art that the combinations or identifiers can also be entered into the printing system 303 using other devices such as a keyboard and that a bar code is an exemplary representation of a combination.

Optionally, a specific identifier or code for each entity is also included in each combination. Thus, if the entity 302 and the entity 304 submit the same media/page size pair, the combination generated by the coding entity 300 will be different even though both combinations ultimately refer to the same media/page size pair. This is advantageous to the particular entities and enables them to retain customers and sell product such as media in addition to the printing services. If the combinations include the entity identifier, then the combinations issued to the entity 302 will not work and are not accessible by the entity 304 or any other entity. Alternatively, a combination can be generated that is valid for a group of entities.

The combinations or the identifiers that are supplied by the coding entity 300 are often an encrypted or hashed form of the media/page size pair. When a user selects a combination at the printing system 303 of the entity 302, the available media/page size pairs in the printing system are encrypted or hashed on the fly or otherwise coded until the hash or encryption of a particular media/page size pair matches the selected combination. After the appropriate media/page size is thus selected, the printing system permits the user to print on the selected media/page size pair. Alternatively, the combinations or identifiers supplied by the coding entity 300 directly correlate to the media/page size pairs that are available from any particular printing system.

One advantage of correlating a combination with a media/page size pair at run time is that the connection between a media/page size pair and the combination is essentially undiscoverable by other users or entities and those entities are prevented from using the combinations generated by the coding entity 300. In other words, because the combinations are hashed by the coding entity, the entity receiving the combinations cannot generate their own combinations. In one embodiment, the combinations are generated using a one way hash that prevents the media/page size pairs associated with the combinations from being discovered. It is appreciated that one of skill in the art that combinations can be generated using other encryption, hashing, or coding techniques.

The combinations are not usually stored by the printing system. This helps ensure, in one embodiment, that the combinations remain protected. As previously stated, the combinations are coded and are compared with identifiers in the printing system that are similarly coded on the fly. The media/page size pair is thus selected when the combination matches an identifier that was coded or other wise hashed or encrypted on the fly. This prevents an entity from generating their own combinations for new media/page size pairs. It also permits entities to ensure that the printing systems only print on the media/page size pairs supplied by that entity.

An exemplary bar code or combination may include 12 characters, although it is understood by one of skill in the art that a bar code or combination can include any number of characters. The available characters, for simplicity, may be limited to alphanumeric characters. In this specific example, three of the characters represent an entity identifier and one of the characters represents a hash arbiter. Seven of the characters represent a hash that incorporates the media and the page size. Alternatively, the hash incorporates the entity, the media, and the page size. A final character represents a checksum to ensure that the encoded data is correct. The combination thus represents an entity, a media, and/or a page size in one embodiment.

Figure 4:
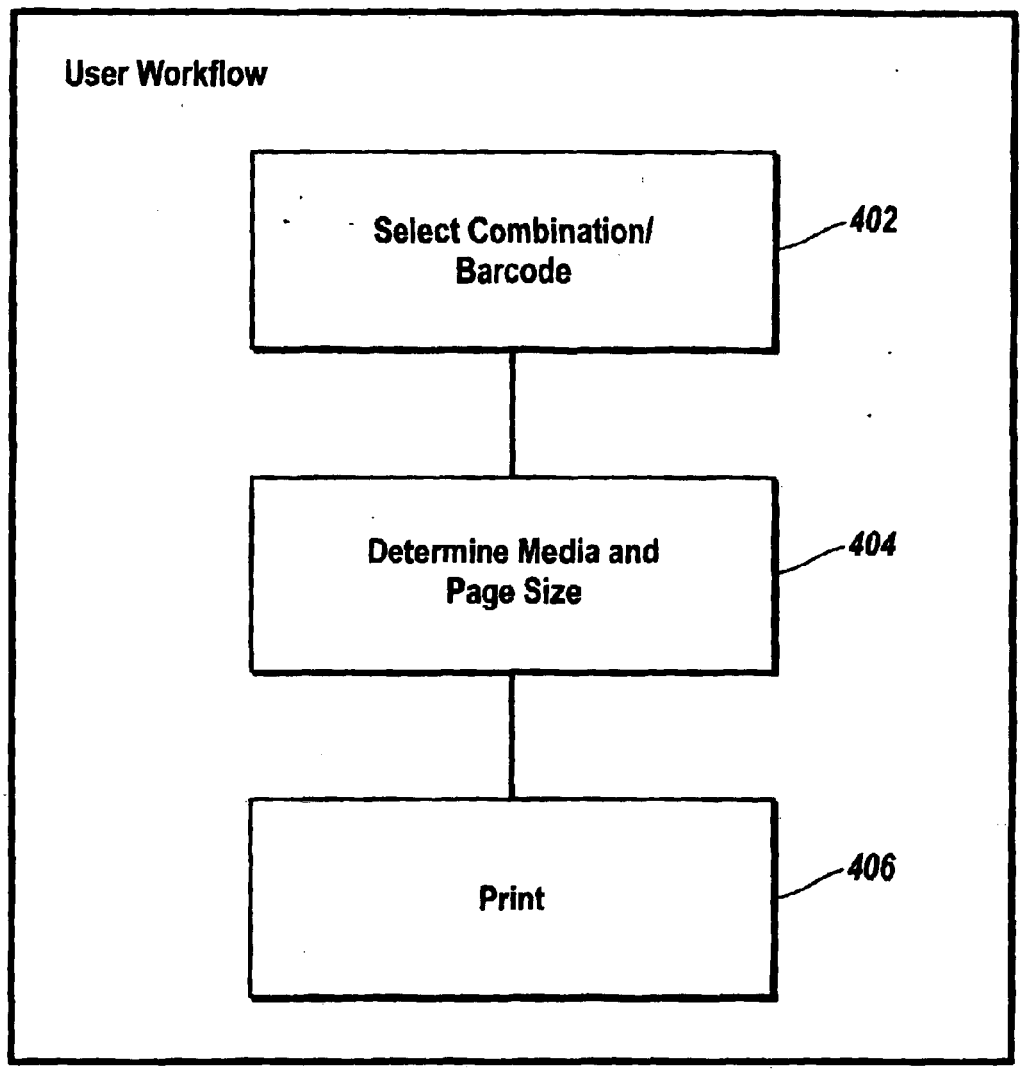
FIG. 4 illustrates a user workflow for printing a print job.

FIG. 4 represents a user experience or workflow that occurs, for example, when a user is using a printing system. First, the user selects an identifier or combination (402). The user can make the selection, for example, using a bar code reader or by entering the combination via a keyboard. When the combination or identifier includes an entity identifier, the entity providing the printing system is validated using the printer/entity identifiers shown in FIG. 1. Validation of the entity is optional.

If the entity is successfully validated or if the identity of the entity is not an issue, then the media/page size pair that corresponds to the selected combination is determined (404). The combination or a portion of the combination is a hash or other coded value that represents a particular media/page size pair. Note that a similar procedure can be applied to the combination or a portion of the combination when validating the entity as described above. The media/page size pairs available to the printing system are hashed or coded and compared to the combination or portion of the combination until a match is discovered. After a match is found, the media/page size pair corresponding to the selected combination is loaded in the appropriate printer, unless the media is already loaded, and used to print (406) the print job of the user. The color profile is typically automatically associated with the selected media/page size.

The present invention extends to both methods and systems for selecting media and page sizes. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a printing system that includes a plurality of medias, wherein each media is available in at least one page size, a method for selecting a media/page size pair, the method comprising:

selecting a combination from a list of combinations, wherein each combination in the list of combinations is associated with a particular media/page size pair;

generating one or more coded identifiers after the combination is selected from the list of combinations, each coded identifier associated with a particular media/page size pair;

comparing the selected combination with the one or more coded identifiers; and determining the particular media/page size pair from the coded identifier that matches the selected combination.

2. A method as defined in claim 1, wherein determining the particular media/page size pair from the identifier that matches the selected combination further comprises identifying each media/page size pair available to the printing system.

3. A method as defined in claim 2, wherein selecting a combination from a list of combinations further comprises:

submitting each media/page size pair in the printing system to a coding entity; and receiving a combination for each media/page size pair from the coding entity.

4. A method as defined in claim 3, wherein the selected combination is hashed and represents one or more of a media, a page size, and an entity, wherein generating one or more coded identifiers after the combination is selected from the list of combinations further comprises:

hashing each identifier when the combination is selected; and comparing each hashed identifier with the selected combination.

5. A method as defined in claim 1, wherein determining the particular media/page size pair from the identifier that matches selected combination further comprises:

determining whether an entity represented in the selected combination is included in an approved entity list maintained by the printing system; and permitting a print job to print if the entity represented in the selected combination is included in the approved entity list.

6. A method as defined in claim 1, further comprising printing a print job using the particular media/page size pair associated with the selected combination.

7. A method as defined in claim 1, further comprising locking at least a portion of the printing system such that only combinations that include an approved entity identifier can be used to select a media/page size pair.

8. A method as defined in claim 1, further comprising not storing the list of combinations in a memory of the printing system.

9. In a printing system that provides a plurality of medias, a method for selecting a media and a page size of the media from the plurality of medias for a print job, the method comprising:

receiving a combination from a user at a printing system, wherein the combination is coded and represents a particular media and a page size of the particular media;

coding at least one identifier in a list of identifiers maintained by the printing system;

comparing the combination received from the user with the coded identifiers; and selecting the particular media and the page size of the particular media that is represented by the combination if the combination matches a coded identifier from the list of identifiers.

10. A method as defined in claim 9, wherein receiving a combination from a user at a printing system further comprises providing a list of combinations to the user, wherein each combination is a bar code and each combination represents one or more of an entity identifier, a media, and a page size.

11. A method as defined in claim 9, wherein comparing the combination with coded identifiers further comprises:

hashing each identifier included in the list of identifiers; and comparing each hashed identifier with the combination received from the user.

12. A method as defined in claim 11, further comprising:

determining if the combination received from the user includes an entity identifier;

determining that the entity identifier is valid for the printing system by comparing the entity identifier with other entity identifiers stored by the printing system; and printing a print job on the particular media and the page size of the particular media that correspond to the combination if the entity identifier is valid.

13. A method as defined in claim 12, further comprising sending the print job to a printer adapted for printing on the particular media and the page size of the particular media that corresponds to the combination received from the user.

14. A method as defined in claim 12, further comprising locking one or more printers of the printing system, wherein each locked printer can only be used if the entity identifier in the combination is valid.

15. A method as defined in claim 13, further comprising unlocking one or more printers of the printing system where each unlocked printer can be used even if the entity identifier in the combination is not valid.

16. A method is defined in claim 9, further comprising printing a print job on the particular media and the page size of the particular media associated with the combination.

17. A computer program product having computer-executable instructions for performing the method of claim 9.

18. A method for managing media used for print jobs, the method comprising:
   identifying each media/page size pair used in a printing system, wherein the printing system includes one or more printers adapted for printing on each media/page size pair;
   providing each media/page size pair used in the printing system to a coding entity;
   receiving a combination from the coding entity for each media/page size pair, wherein the combination is coded such that the printing system cannot generate new combinations for new media/page size pairs; and
   providing a list of combinations to users of the printing system, wherein users print a print job on a particular media/page size pair by selecting a particular combination associated with the particular media/page size pair.

19. A method as defined in claim 18, further comprising:
   storing each media/page size pair at the printing system; and
   making the list of combinations available to users without storing the list of combinations in memory of the printing system.

20. A method as defined in claim 19, further comprising:
   receiving a combination from a user for a print job;
   generating a list of identifiers, wherein each identifier corresponds to a different media/page size pair and wherein each identifier is coded;
   comparing the received combination with the coded identifiers; and
   identifying a particular media/page size that corresponds to a coded identifier that matches the received combination.

21. A method as defined in claim 20, further comprising:
   storing a list of entity identifiers at the printing system; and
   including at least one entity identifier in each coded identifier.

22. A method as defined in claim 21, further comprising locking the printing system if an entity identifier included in the received combination does not match an entity identifier such that the user cannot select a media/page size pair for a print job.

23. A method as defined in claim 21, further comprising locking a portion of the printing system if an entity identifier included in the received combination does not match en entity identifier such that the user can only select a particular media/page size pair or only use a particular printer of the printing system.

24. A method as defined in claim 18, wherein only media/page size pairs having a combination from the coding entity can be selected by a user.

25. A method as defined in claim 18, further comprising automatically selecting a color profile of the media/page size pair associated with the received combination.

26. A computer program product having computer executable instructions for performing the method of claim 18.

* * * * *

UNITED STATES PATENT AND TRADEMARK OFFICE
CERTIFICATE OF CORRECTION

PATENT NO. : 6,752,082 B2  Page 1 of 1
APPLICATION NO. : 10/370898
DATED : June 22, 2004
INVENTOR(S) : Derhak et al.

It is certified that error appears in the above-identified patent and that said Letters Patent is hereby corrected as shown below:

Column 6,
Line 4, after "established by" remove "in".

Column 7,
Lines 41-42, change "It is appreciated that" to -- It will be appreciated by --.

Column 8,
Line 59, after "following discussion" change "are" to -- is --.

Column 12,
Line 23, after "does not match" change "en" to -- an --.

Signed and Sealed this

Twentieth Day of June, 2006

JON W. DUDAS
*Director of the United States Patent and Trademark Office*